US008593937B2

(12) United States Patent
Sudo

(10) Patent No.: US 8,593,937 B2
(45) Date of Patent: Nov. 26, 2013

(54) OFDM-CDMA EQUIPMENT AND METHOD

(71) Applicant: Panasonic Corporation, Osaka (JP)

(72) Inventor: Hiroaki Sudo, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/856,278

(22) Filed: Apr. 3, 2013

(65) Prior Publication Data

US 2013/0215998 A1    Aug. 22, 2013

Related U.S. Application Data

(63) Continuation of application No. 13/445,746, filed on Apr. 12, 2012, which is a continuation of application No. 12/481,485, filed on Jun. 9, 2009, now Pat. No. 8,179,776, which is a continuation of application No. 11/497,263, filed on Aug. 2, 2006, now Pat. No. 7,558,190, which is a continuation of application No. 09/512,262, filed on Feb. 24, 2000, now Pat. No. 7,106,689.

(30) Foreign Application Priority Data

Mar. 2, 1999   (JP) .................................... 11-054667
Sep. 3, 1999   (JP) .................................... 11-249938

(51) Int. Cl.
  *H04J 11/00*  (2006.01)
  *H04L 12/28*  (2006.01)
  *H04L 1/18*   (2006.01)

(52) U.S. Cl.
  USPC ........................... 370/208; 370/390; 714/748

(58) Field of Classification Search
  None
  See application file for complete search history.

(56) References Cited

U.S. PATENT DOCUMENTS

| 5,617,411 | A | 4/1997 | Mueller |
| 5,694,389 | A | 12/1997 | Seki et al. |
| 5,732,068 | A | 3/1998 | Takahashi et al. |
| 5,732,113 | A | 3/1998 | Schmidl et al. |
| 5,771,224 | A | 6/1998 | Seki et al. |
| 5,982,327 | A | 11/1999 | Vook et al. |
| 6,031,818 | A | 2/2000 | Lo et al. |
| 6,169,768 | B1 | 1/2001 | Okada et al. |
| 6,192,026 | B1 | 2/2001 | Pollack et al. |

(Continued)

FOREIGN PATENT DOCUMENTS

| EP | 0 854 619 A1 | 7/1998 |
| EP | 0 866 577 B1 | 9/1998 |

(Continued)

OTHER PUBLICATIONS

Chow et al., "A Multi-drop In-house ADSL Distribution Network," 19940501; 19940501-19940505, IEEE, May 1, 1994, pp. 456-460, XP010126562.

(Continued)

*Primary Examiner* — Melanie Jagannathan
(74) *Attorney, Agent, or Firm* — Seed IP Law Group PLLC

(57) ABSTRACT

An OFDM signal transmission apparatus is provided, which includes a mapping unit configured to map first signals into N subcarriers and second signals into M subcarrier(s) to form an OFDM signal, wherein N is larger than M. The first signals are each indicating a same bit of retransmission information and the second signals are each indicating a same bit of information other than retransmission information. The OFDM signal transmission apparatus further includes a transmitting unit configured to transmit the formed OFDM signal.

4 Claims, 15 Drawing Sheets

(56) References Cited

U.S. PATENT DOCUMENTS

| | | |
|---|---|---|
| 6,377,566 B1 | 4/2002 | Cupo et al. |
| 6,512,758 B1 | 1/2003 | Sato et al. |
| 6,522,700 B1 | 2/2003 | Zimmermann et al. |
| 6,795,424 B1 | 9/2004 | Kapoor et al. |
| 7,010,048 B1 | 3/2006 | Shattil |

FOREIGN PATENT DOCUMENTS

| | | |
|---|---|---|
| JP | 10-308717 A | 11/1998 |
| JP | 10-336159 A | 12/1998 |
| JP | 11-55206 A | 2/1999 |
| JP | 11266224 A | 9/1999 |
| WO | 98/16043 A1 | 4/1998 |
| WO | 99/05798 A1 | 2/1999 |

OTHER PUBLICATIONS

English translation of Korean Office Action.
European Search Report, dated Feb. 20, 2004.
European Search Report, dated Mar. 30, 2006.
European Search Report, dated Aug. 25, 2008.
Japanese Office Action (2000-056166), dated Mar. 8, 2005, with English translation.
Japanese Office Action (2003-102926), dated Mar. 8, 2005, with English translation.
Korean Office Action, dated Jan. 26, 2002.
Matsumoto et al., "OFDM Subchannel Space-Combining Transmission Diversity (SC-TD) for TDMA-TDD Broadband Wireless Accsess (sic) Systems," B-5-16, p. 380, 1998.

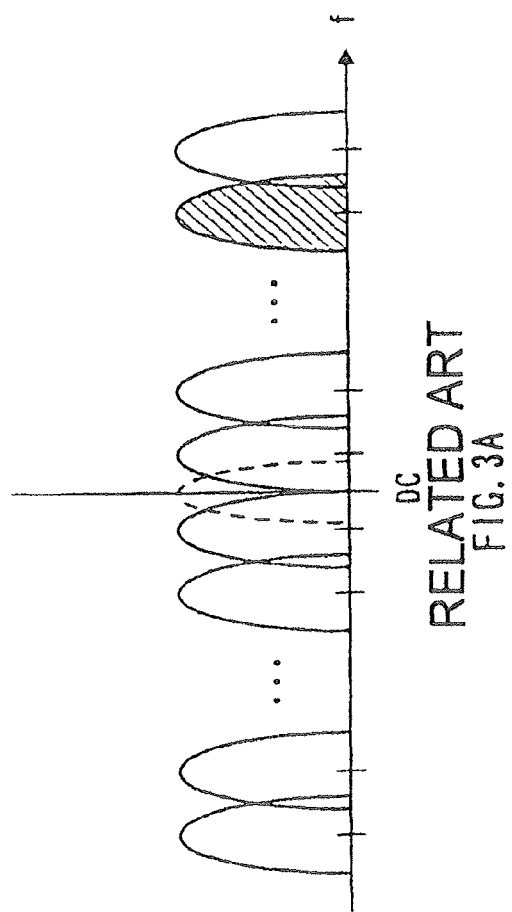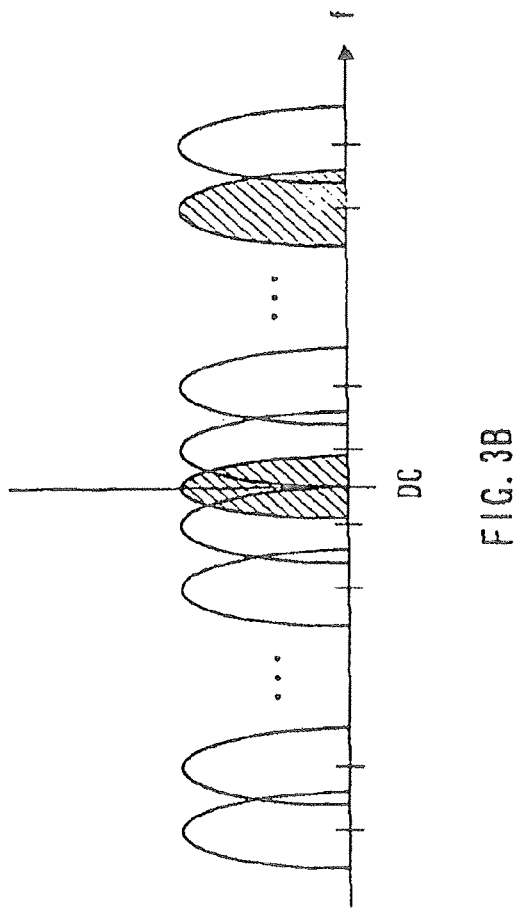

OFDM-CDMA EQUIPMENT AND METHOD

BACKGROUND

1. Technical Field

The present invention relates to a transmission/reception apparatus used for digital mobile communications, and particularly relates to an OFDM (Orthogonal Frequency Division Multiplexing) transmission/reception apparatus and OFDM transmission/reception method used for OFDM-based mobile communications.

2. Description of the Related Art

In an OFDM-based mobile communication, transmission data is converted to a plurality of slower parallel signals, which are superimposed over their respective subcarriers and transmitted. The following is an explanation of a conventional OFDM transmission/reception apparatus with reference to FIG. 1 and FIG. 2. FIG. 1 is a block diagram showing a configuration of a transmission system of a conventional OFDM transmission/reception apparatus. FIG. 2 is a block diagram showing a configuration of a reception system of the conventional OFDM transmission/reception apparatus. For simplification, suppose a plurality of signal lines are also expressed with a single arrow.

In FIG. 1, modulation section 11 modulates transmission data. Inverse Fast Fourier Transform (hereinafter referred to as "IFFT") section 12 performs IFFT processing on the modulated transmission data.

Transmission section 13 performs transmission processing on the IFFT-processed transmission data and transmits this data from antenna 14. In FIG. 2, antenna 21 receives a radio signal.

Reception section 22 performs reception processing on the signal received from antenna 21 (reception signal). Timing control section 23 controls each section according to a symbol synchronization timing acquired from reception section 22. Fast Fourier Transform (hereinafter referred to as "FFT") section 24 performs FFT processing on the reception signal. Regarding the acquisition of symbol synchronization timing in reception section 22, a variety of methods are proposed. However, their detailed explanations are omitted here.

Synchronization detection section 25 performs synchronization detection processing on the FFT-processed reception signal and removes influences of phase rotation and amplitude variation caused by fading, etc. from the reception signal above.

Thus, the conventional OFDM transmission/reception apparatus achieves large-capacity and high-quality radio communications with excellent multi-path adaptability through data transmission/reception using a plurality of subcarriers.

However, in the conventional OFDM transmission/reception apparatus, important information used for communication control such as control information and retransmission information (hereinafter, simply referred to as "important information") is multiplied by a carrier frequency signal together with user data and transmitted through one of subcarriers.

Therefore, if the reception quality of subcarriers carrying the important information deteriorates in an extreme manner due to influences of fading, etc., errors may occur in bits representing control information and retransmission information, which will prevent appropriate control and retransmission requests, etc., extremely deteriorating the channel quality.

BRIEF SUMMARY

The present invention has been implemented taking account of the points described above and it is an objective of the present invention to provide an OFDM transmission/reception apparatus capable of improving the quality of important information received by the apparatus on the receiving side.

This objective is achieved by transmitting important information with two subcarriers instead of one subcarrier in the conventional manner. This objective is further achieved by using one of the two subcarriers carrying important information as the subcarrier with a carrier frequency signal (DC signal) of frequency 0 which was conventionally not used.

BRIEF DESCRIPTION OF THE SEVERAL VIEWS OF THE DRAWINGS

The above and other objects and features of the invention will appear more fully hereinafter from a consideration of the following description taken in connection with the accompanying drawing wherein one example is illustrated by way of example, in which;

FIG. 3A is a schematic diagram showing a spectrum example in the conventional OFDM system;

FIG. 3B is a schematic diagram showing a spectrum example according to Embodiment 1 of the present invention;

DETAILED DESCRIPTION

With reference now to the attached drawings, the embodiments of the present invention are explained in detail below.
(Embodiment 1)

The OFDM transmission/reception apparatus according to the present embodiment transmits important information with two subcarriers and uses one of these two subcarriers carrying important information to carry a carrier frequency signal (DC signal) of angular frequency 0 which was conventionally not used.

A conceivable method to prevent the reception quality of a subcarrier containing important information from extremely deteriorating due to influences of fading, etc. causing errors in the bits representing control information and retransmission information is to carry same important information through a plurality of subcarriers and for the apparatus on the receiving side to use the important information carried by the subcarrier with the best reception quality or combine all important information carried.

This method may indeed improve the reception quality of important information at the apparatus on the receiving side, however causes a new problem of increasing the amount of transmission data in addition to the user data, thus reducing transmission efficiency.

Therefore, the present embodiment will transmit same important information with two subcarriers and use, as one of these two subcarriers, a subcarrier with a carrier frequency signal (DC signal; hereinafter simply referred to as "DC") of frequency 0 which was conventionally not used as a subcarrier, thus preventing deterioration of transmission efficiency.

As shown in a spectrum diagram of FIG. 3A, a normal OFDM system uses an even number of subcarriers and the subcarrier with DC shown by a dotted line in the diagram is not used as a subcarrier. FIG. 3A shows that important information is mapped onto the second subcarrier indicated by hatching.

Thus, the present embodiment transmits important information that used to be transmitted with one subcarrier (here, the second subcarrier) with a DC subcarrier, which is conventionally not used as a subcarrier, and in this way the present embodiment can transmit same important information through two subcarriers without deteriorating the transmission efficiency.

FIG. 3B shows a spectrum diagram when same important information is carried by two subcarriers in the present embodiment. As is clear from FIG. 3B, the same important information is multiplied not only by the second subcarrier but also by the DC subcarrier.

Figure 1:
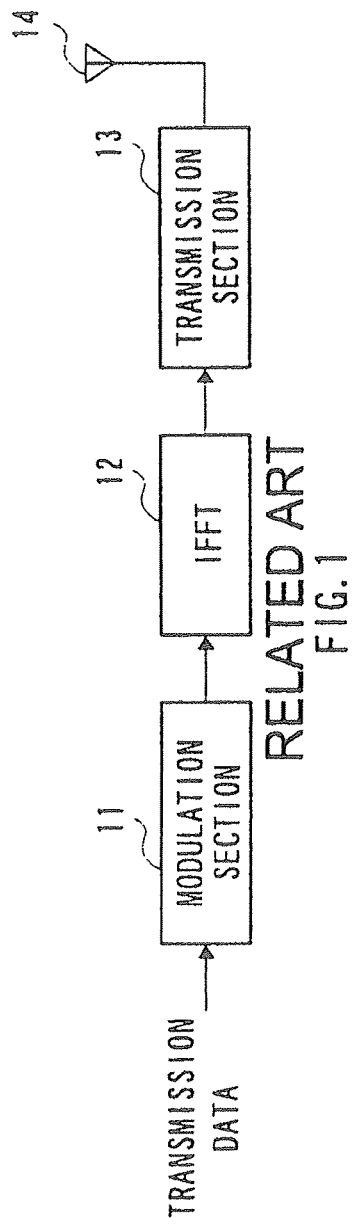
FIG. 1 is a block diagram showing a configuration of a transmission system of a conventional OFDM transmission/reception apparatus.
Figure 2:
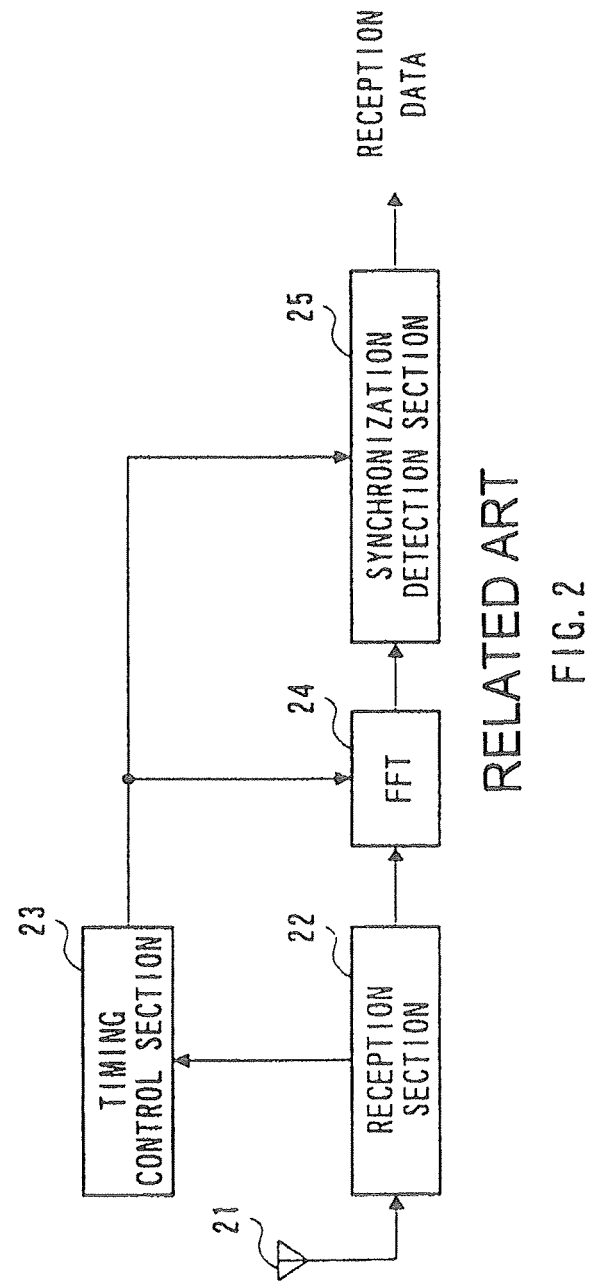
FIG. 2 is a block diagram showing a configuration of a reception system of the conventional OFDM transmission/reception apparatus.
Figure 4:
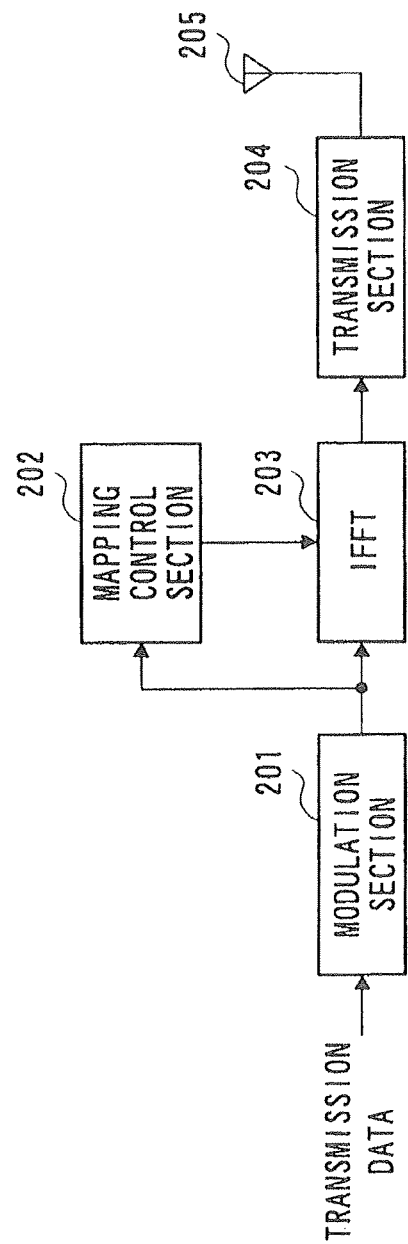
FIG. 4 is a block diagram showing a configuration of a transmission system of an OFDM transmission/reception apparatus according to Embodiment 1 of the present invention.
Figure 5:
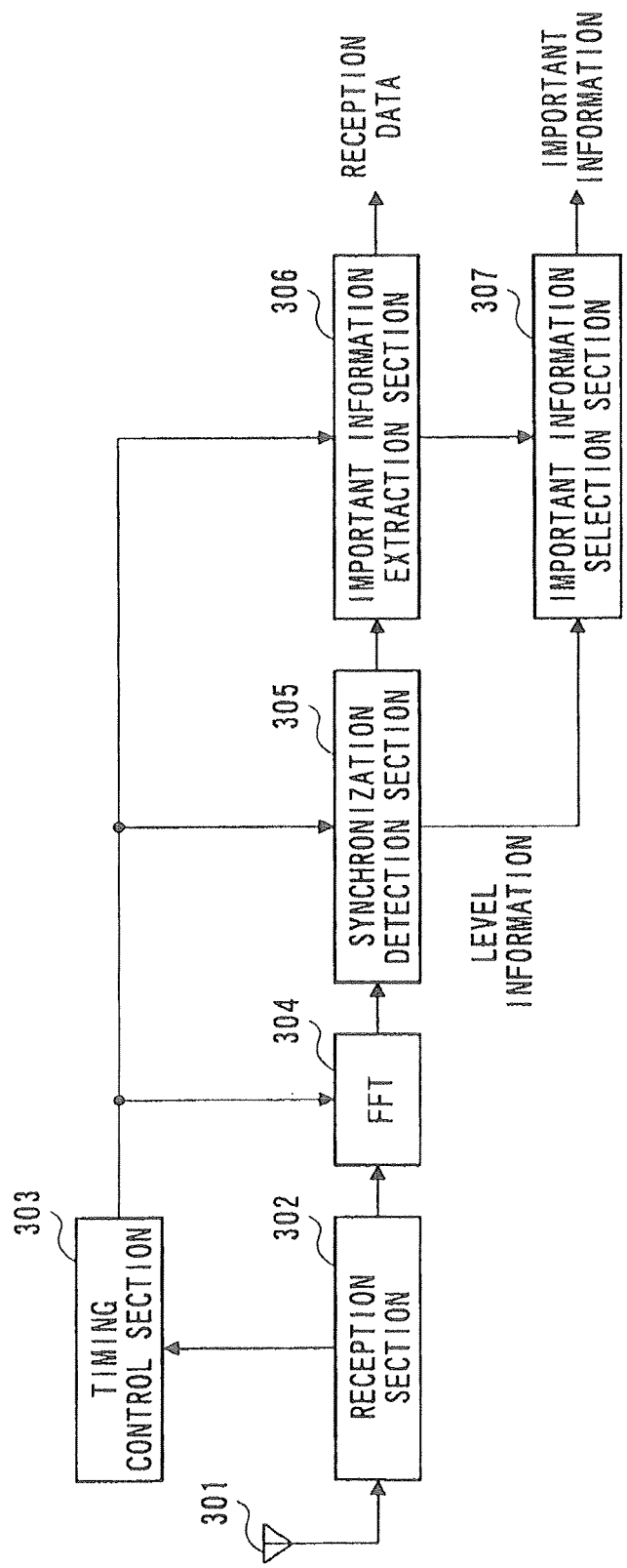
FIG. 5 is a block diagram showing a configuration of a reception system of the OFDM transmission/reception apparatus according to Embodiment 1 of the present invention.
Figure 6:
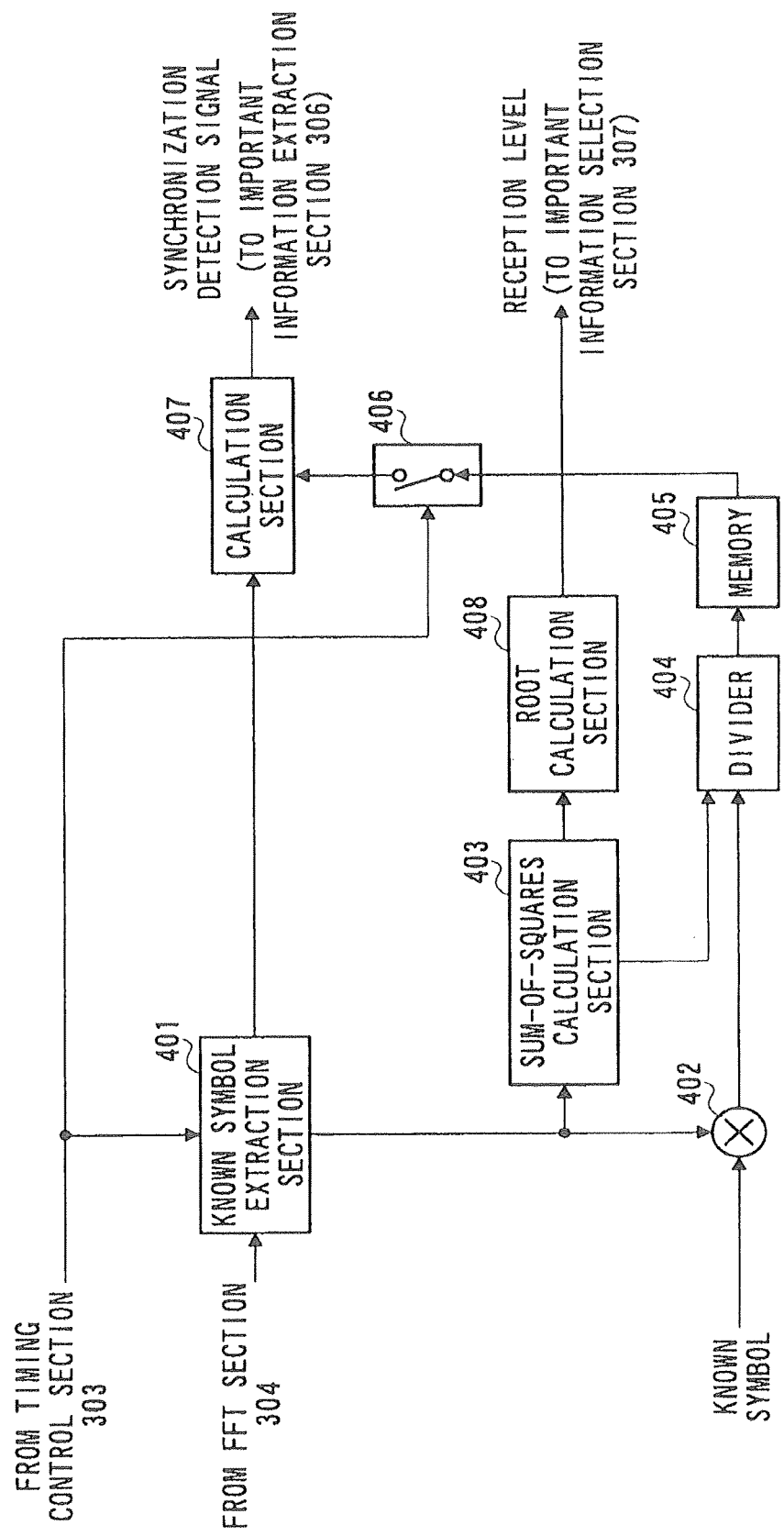
FIG. 6 is a block diagram showing a configuration of a synchronization detection section in the reception system of the OFDM transmission/reception apparatus according to Embodiment 1 of the present invention.

The OFDM transmission/reception apparatus according to the present embodiment is explained with reference to FIG. 4 through FIG. 6 below. FIG. 4 is a block diagram showing a configuration of a transmission system of the OFDM transmission/reception apparatus according to Embodiment 1 of the present invention. FIG. 5 is a block diagram showing a configuration of a reception system of the OFDM transmission/reception apparatus according to Embodiment 1 of the present invention. FIG. 6 is a block diagram showing a configuration of a synchronization detection section in the reception system of the OFDM transmission/reception apparatus according to Embodiment 1 of the present invention. In the present embodiment, important information is transmitted with two subcarriers; the second subcarrier and DC subcarrier, as shown in FIG. 3B.

In FIG. 4, modulation section 201 performs modulation processing on transmission data. Mapping control section 202 controls IFFT section 203 so that the important information is mapped onto the second subcarrier and DC subcarrier. IFFT section 203 performs IFFT processing on the modulated transmission data. Transmission section 204 performs transmission processing on the IFFT-processed transmission data and transmits the transmission-processed transmission data from antenna 205.

In FIG. 5, antenna 301 receives a radio signal. Reception section 302 performs reception processing on the signal received by antenna 301 (reception signal). Timing control section 303 controls each section according to a symbol synchronization timing acquired from reception section 302. FFT section 304 performs FFT processing on the reception signal. Regarding the acquisition of symbol synchronization timing at reception section 302, a variety of methods are proposed. The present embodiment can use any method for the acquisition of symbol synchronization timing.

Synchronization detection section 305 performs synchronization detection processing (demodulation processing) on the FFT-processed reception signal and removes influences of phase rotation and amplitude variation caused by fading, etc. from the reception signal above.

Important information extraction section 306 extracts important information from the reception signal subjected to synchronization detection processing important information selection section 307 detects the subcarrier with the higher reception level of the two subcarriers with important information multiplied based on reception level information detected by synchronization detection section 305, and extracts and outputs the important information carried by the detected subcarrier.

In FIG. 6 showing the synchronization detection section, based on the symbol synchronization timing indicated by timing control section 303, known symbol extraction section 401 extracts a signal during a known symbol interval from the FFT-processed reception signal to output the signal to multiplier 402, and extracts a signal during a data symbol interval to output the signal to calculation section 407.

Multiplier 402 multiplies the signal of the known symbol interval of the FFT-processed reception signal by a predetermined known symbol and calculates phase rotation and amplitude variation of the reception signal influenced by fading, etc.

Sum-of-squares calculation section 403 calculates a sum of squares of an I component and Q component of the output of known symbol extraction section 401. The calculated sum of squares is output to divider 404 and root calculator 408.

Divider 404 divides the output of multiplier 402 by the output of sum-of-squares calculation section 403. Memory 405 temporarily stores the output of divider 404.

Switch 406 outputs the output of divider 404 stored in memory 405 to calculation section 407 while the signal during the data symbol interval of the reception signal is being input to calculation section 407 based on the symbol synchronization timing indicated by timing control section 303.

Calculation section 407 generates a conjugate complex number of the output of divider 404, multiplies the signal during the data symbol interval of the reception signal by this conjugate complex number to obtain a synchronization detection signal.

Root calculator 408 carries out a root calculation on the sum of squares from sum-of-squares calculation section 403 and calculates the reception level of the reception signal. The calculated reception level is output to important information selection section 307.

Then, the operation of the OFDM transmission/reception apparatus in such a configuration is explained below. According to FIG. 4, the transmission data is modulated by modulation section 201. While being controlled by mapping control section 202 so that important information is multiplied by the second subcarrier and DC subcarrier, the modulated transmission data is IFFT-processed by IFFT section 203. The IFFT-processed transmission data is subjected to transmission processing in transmission section 204 and then transmitted from antenna 205.

The radio signal with the important information multiplied by the second subcarrier and DC subcarrier is received by antenna 301 (see FIG. 5). The signal received by antenna 301 (reception signal) is subjected to reception processing by reception section 302. The reception-processed reception signal is FFT-processed by the FFT section 304. The FFT-processed reception signal is subjected to synchronization detection processing by synchronization detection section 305.

In important information extraction section 306, the important information carried by the DC subcarrier and the important information carried by the second subcarrier are extracted from the reception signal subjected to synchronization detection processing. Each extracted important information is output to important information selection section 307. In important information selection section 307, of the important information extracted by important information extraction section 306, the important information carried by the subcarrier with the higher reception level is output, based on the reception level information output from synchronization detection section 305.

Thus, according to the present embodiment, the apparatus on the transmitting side carries important information with two subcarriers and the apparatus on the receiving side uses, of the important information carried by the two subcarriers, the important information with the better reception level, which allows the reception quality of important information to be maintained even in a fading environment where only the reception level of a specific subcarrier deteriorates.

Furthermore, when transmitting important information with two subcarriers, the present embodiment uses, as one of the subcarriers, the DC subcarrier, which was conventionally not used as a subcarrier, and in this way can transmit important information with two subcarriers without reducing the transmission efficiency.

The number of subcarriers carrying same important information is not limited to 2 as described above; it goes without saying that the quality of important information will further be improved by using more subcarriers and selecting ones with better reception conditions. However, assigning many subcarriers to important information will decrease the number of subcarriers used for transmission of user data and reduce the transmission efficiency, and therefore it is most desirable to limit the number of subcarriers carrying important information to 2 and use as one of them a DC subcarrier as in the case of the present embodiment.

(Embodiment 2)

The OFDM transmission/reception apparatus according to the present embodiment has the same configuration as that of the OFD transmission/reception apparatus according to Embodiment 1 except that the reception level, one of outputs of the synchronization detection section, is averaged.

Figure 7:
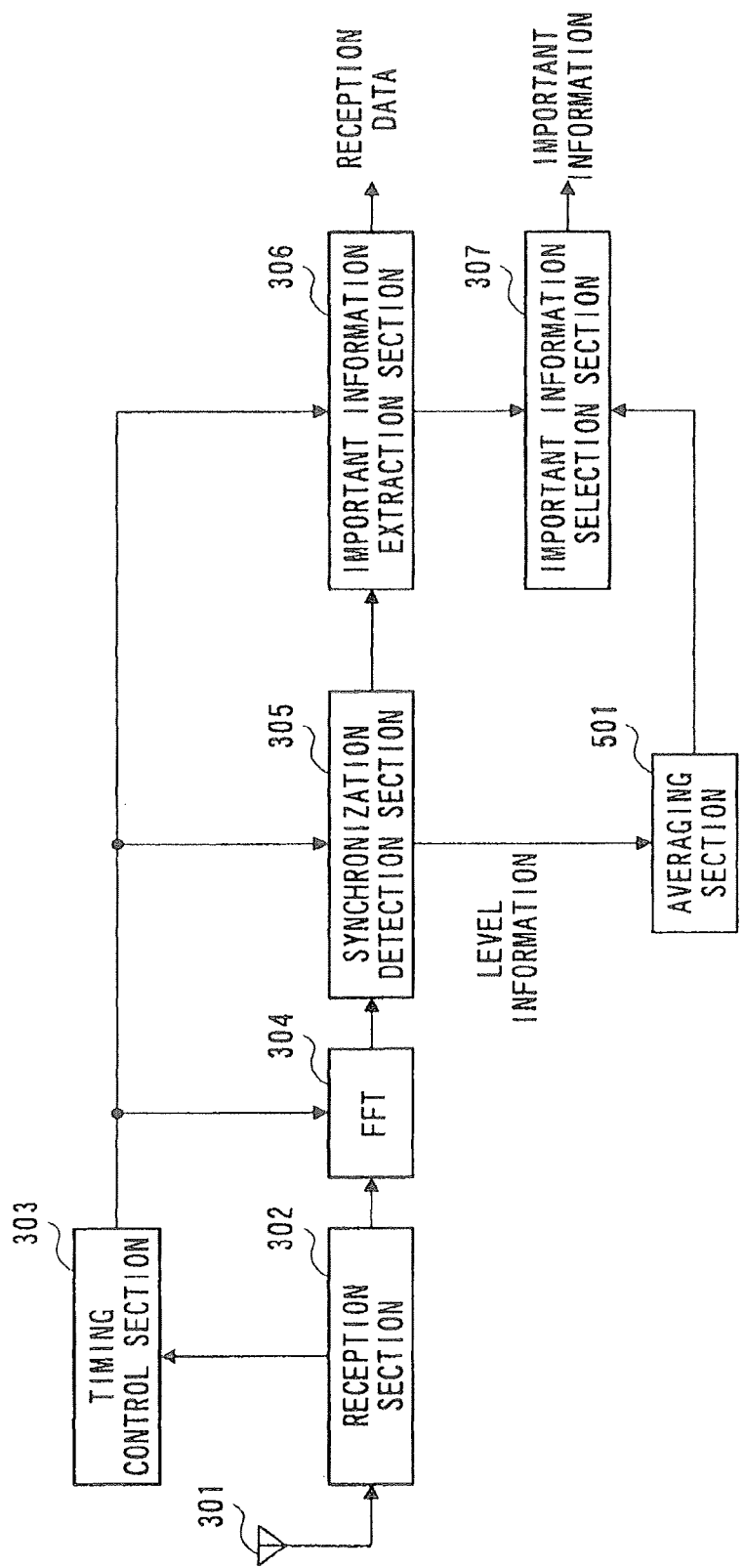
FIG. 7 is a block diagram showing a configuration of a reception system of an OFDM transmission/reception apparatus according to Embodiment 2 of the present invention.

The OFDM transmission/reception apparatus according to the present embodiment is explained with reference to FIG. 7. FIG. 7 is a block diagram showing a configuration of a reception system of the OFDM transmission/reception apparatus according to Embodiment 2 of the present invention. The parts in FIG. 7 with the same configuration as that of Embodiment 1 (FIG. 5) are assigned the same codes as those in FIG. 5 and their detailed explanations are omitted. The block diagram of the transmission system is omitted. The present embodiment also uses the second subcarrier as the subcarrier other than the DC subcarrier to carry important information.

In FIG. 7, averaging section 501 averages reception level information, one of the outputs of synchronization detection section 305 and outputs the averaged reception level information to important information selection section 307.

Thus, when comparing the reception level of subcarriers carrying important information, the present embodiment uses the averaged reception level, and in this way can improve the accuracy in comparing/determining the reception level and thus improve the reception quality of important information. In addition, the number of slots to be averaged or time interval can be determined arbitrarily.

(Embodiment 3)

The OFDM transmission/reception apparatus according to the present embodiment has the same configuration as that of the OFDM transmission/reception apparatus according to Embodiment 2 except that when comparing the reception level of the DC subcarrier and second subcarrier carrying important information, if the reception level of the DC subcarrier is higher, the important information carried by the DC subcarrier is used only when the difference in the reception level between the DC subcarrier and the second subcarrier exceeds a predetermined value.

Since a DC offset may be carried on a signal carried by the DC subcarrier in analog circuits of the apparatuses on the transmitting side and on the receiving side, the reception level at the apparatus on the receiving side may include an error corresponding to the DC offset component.

Therefore, even if the result of a comparison of the reception level between the DC subcarrier and second subcarrier shows that the reception level of the DC subcarrier is higher, if the difference in the reception level between the DC subcarrier and second subcarrier is small, the reception level of the DC subcarrier with the DC offset component removed may fall below the reception level of the second subcarrier.

Therefore, the present embodiment uses a threshold greater than a conceivable DC offset, and uses the important information carried by the DC subcarrier only when it is determined that the difference in the reception level between the DC subcarrier and the second subcarrier is sufficiently greater than the DC offset.

Figure 8:
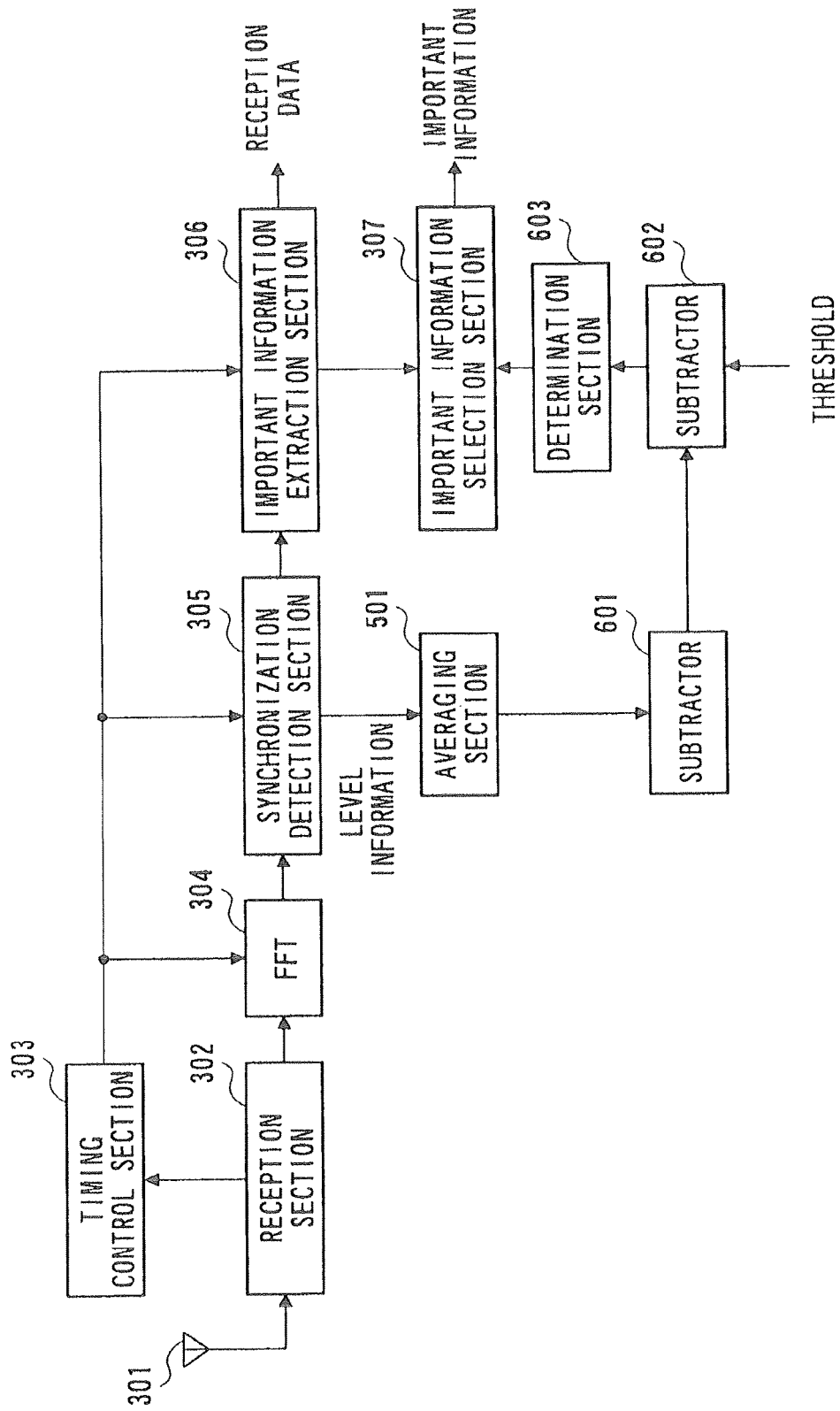
FIG. 8 is a block diagram showing a configuration of a reception system of an OFDM transmission/reception apparatus according to Embodiment 3 of the present invention.

The OFDM transmission/reception apparatus according to the present embodiment is explained with reference to FIG. 8. FIG. 8 is a block diagram showing a configuration of a reception system of the OFDM transmission/reception apparatus according to Embodiment 3 of the present invention. The parts in FIG. 8 with the same configuration as that of Embodiment 2 (FIG. 7) are assigned the same codes as those in FIG. 7 and their detailed explanations are omitted. The block diagram of the transmission system is omitted. The present embodiment also uses the second subcarrier as the subcarrier other than the DC subcarrier to carry important information.

In FIG. 8, subtractor 601 performs a subtraction between the reception level of the DC subcarrier and the reception level of the second subcarrier. Subtractor 602 compares a threshold and the subtraction result, which is the output of subtractor 601.

Determination section 603 determines whether the output of subtractor 602 is positive or negative, determines whether the difference in the reception level between the DC subcarrier and the second subcarrier exceeds the threshold or not and outputs the determination result to important information selection section 307.

Based on the determination result, important information selection section 307 outputs the important information carried by the DC subcarrier when the difference in the reception level between the DC subcarrier and the second subcarrier exceeds the threshold, and outputs the important information carried by the second subcarrier when the difference in the reception level between the DC subcarrier and the second subcarrier is smaller than the threshold.

In this way, the present embodiment can compare/determine the reception level taking account of influences of a DC offset by comparing the difference in the reception level between the DC subcarrier and the second subcarrier. This improves the accuracy in comparing/determining the reception level, thus improving the reception quality of important information.

(Embodiment 4)

The OFDM transmission/reception apparatus according to the present embodiment has the same configuration as that of the OFDM transmission/reception apparatus according to Embodiment 2 except that a determination error, instead of the reception level, is used to select a subcarrier.

As mentioned above, the signal carried by the DC subcarrier contains an error called "DC offset", and therefore the reception quality of the DC subcarrier may be deteriorated more than other subcarriers. Thus, the present embodiment uses a determination error instead of the reception level when selecting a subcarrier.

Figure 9:
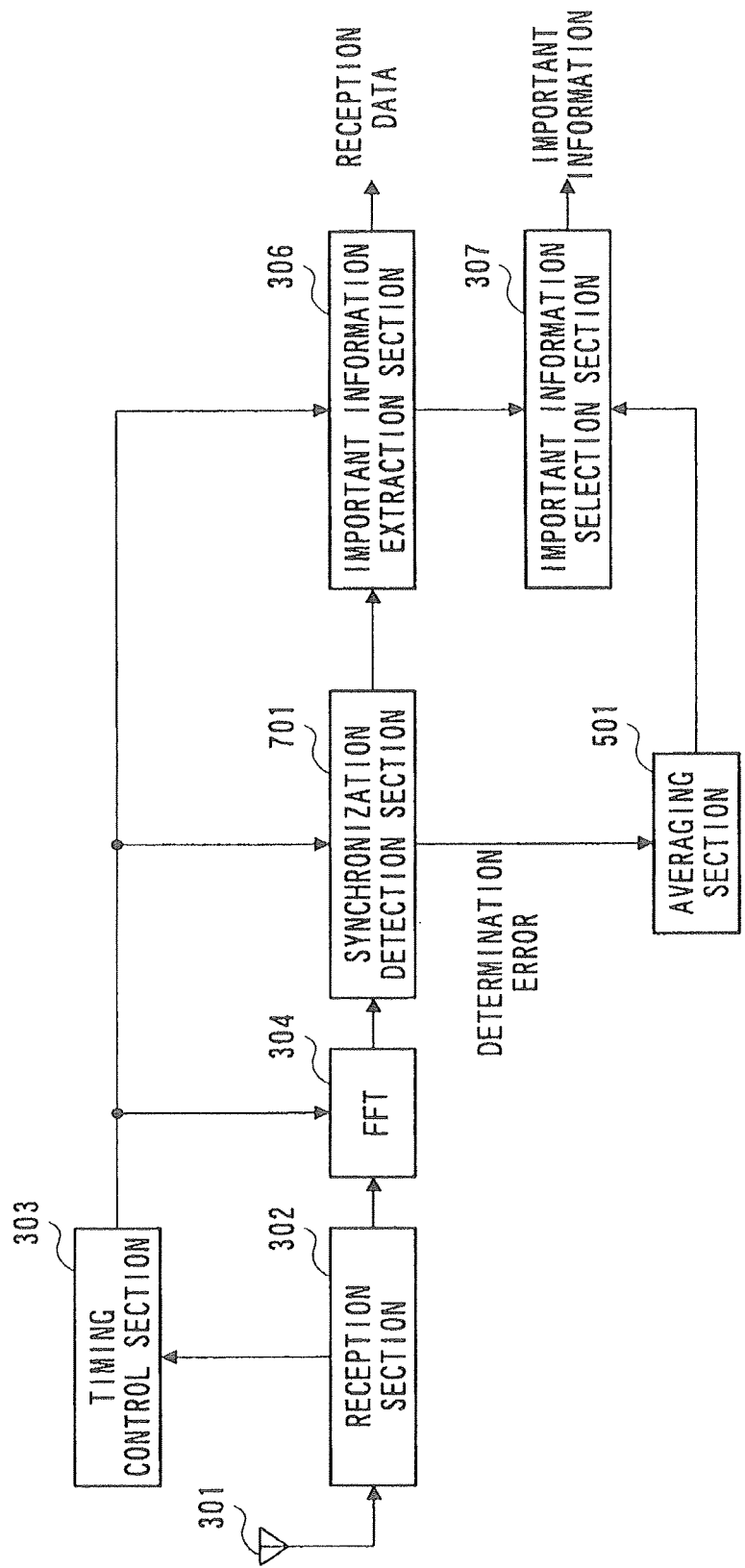
FIG. 9 is a block diagram showing a configuration of a reception system of an OFDM transmission/reception apparatus according to Embodiment 4 of the present invention.
Figure 10:
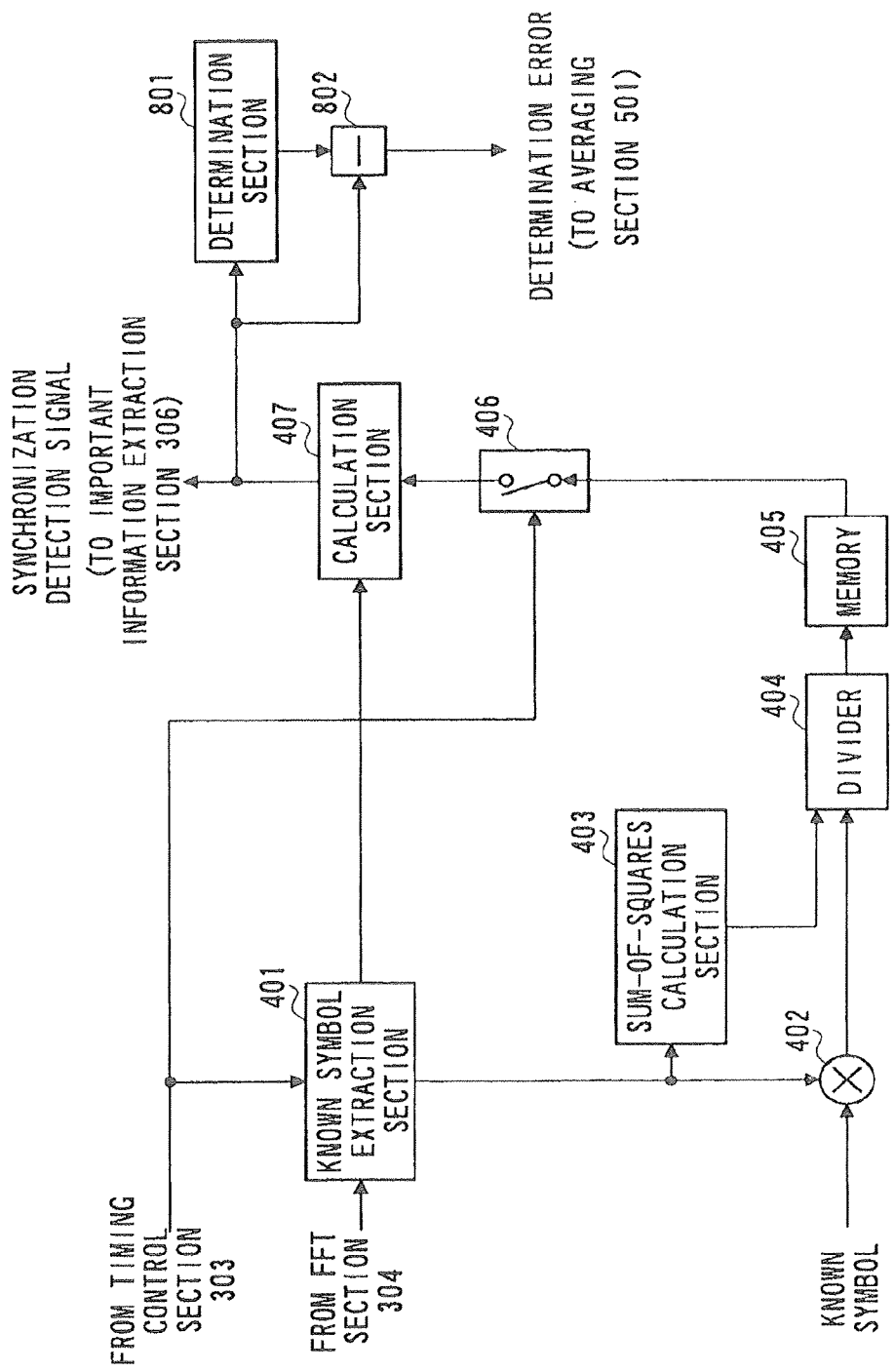
FIG. 10 is a block diagram showing a configuration of a synchronization detection section in the reception system of the OFDM transmission/reception apparatus according to Embodiment 4 of the present invention.

The OFDM transmission/reception apparatus according to the present embodiment is explained with reference to FIG. 9 and FIG. 10. FIG. 9 is a block diagram showing a configuration of a reception system of the OFDM transmission/reception apparatus according to Embodiment 4 of the present invention. FIG. 10 is a block diagram showing a configuration of a synchronization detection section of the reception system of the OFDM transmission/reception apparatus according to Embodiment 4 of the present invention. The parts in FIG. 9 and FIG. 10 with the same configuration as that of Embodiment 1 or Embodiment 2 are assigned the same codes as those in Embodiment 1 or Embodiment 2 and their detailed explanations are omitted. The present embodiment also uses the second subcarrier as the subcarrier other than the DC subcarrier to carry important information.

In FIG. 9, synchronization detection section 701 outputs determination errors of the DC subcarrier and the second subcarrier to averaging section 501. Averaging section 501 calculates an average value of these determination errors and outputs the average value to important information selection section 307. Important information selection section 307 selects and outputs the important information carried by the subcarrier with the smaller determination error.

In FIG. 10, determination section 801 determines a synchronization detection signal. Subtractor 802 performs a subtraction before and after the determination of the signal, generates determination errors and outputs the generated determination errors to averaging section 501.

The calculated determination errors are averaged by averaging section 501. This generates an average value of the determination errors. The average value of the determination errors is output to important information selection section 307.

Important information selection section 307 compares the determination error of the DC subcarrier and that of the second subcarrier and selects and outputs the important information carried by the subcarrier with the smaller determination error.

Thus, the present embodiment determines which subcarrier has better reception quality based on the determination error of the DC subcarrier and that of the second subcarrier to ignore influences of a DC offset and in this way can improve the reception quality of important information.

(Embodiment 5)

The OFDM transmission/reception apparatus according to the present embodiment has the same configuration as that of the OFDM transmission/reception apparatus according to Embodiment 1 except that the FFT-processed DC subcarrier signal is stripped of a DC offset and then subjected to synchronization detection processing.

A DC offset has a constant value irrespective of its digital signal waveform and the probability that a digital signal will take a value of 1 or 0 is assumed to be 50%. Therefore, if FFT-processed digital signals are added up and averaged, 1 and 0 are canceled out and only the DC offset value can be detected. Thus, the present embodiment eliminates the DC offset component from the DC subcarrier signal before synchronization detection processing according to the method above.

Figure 11:
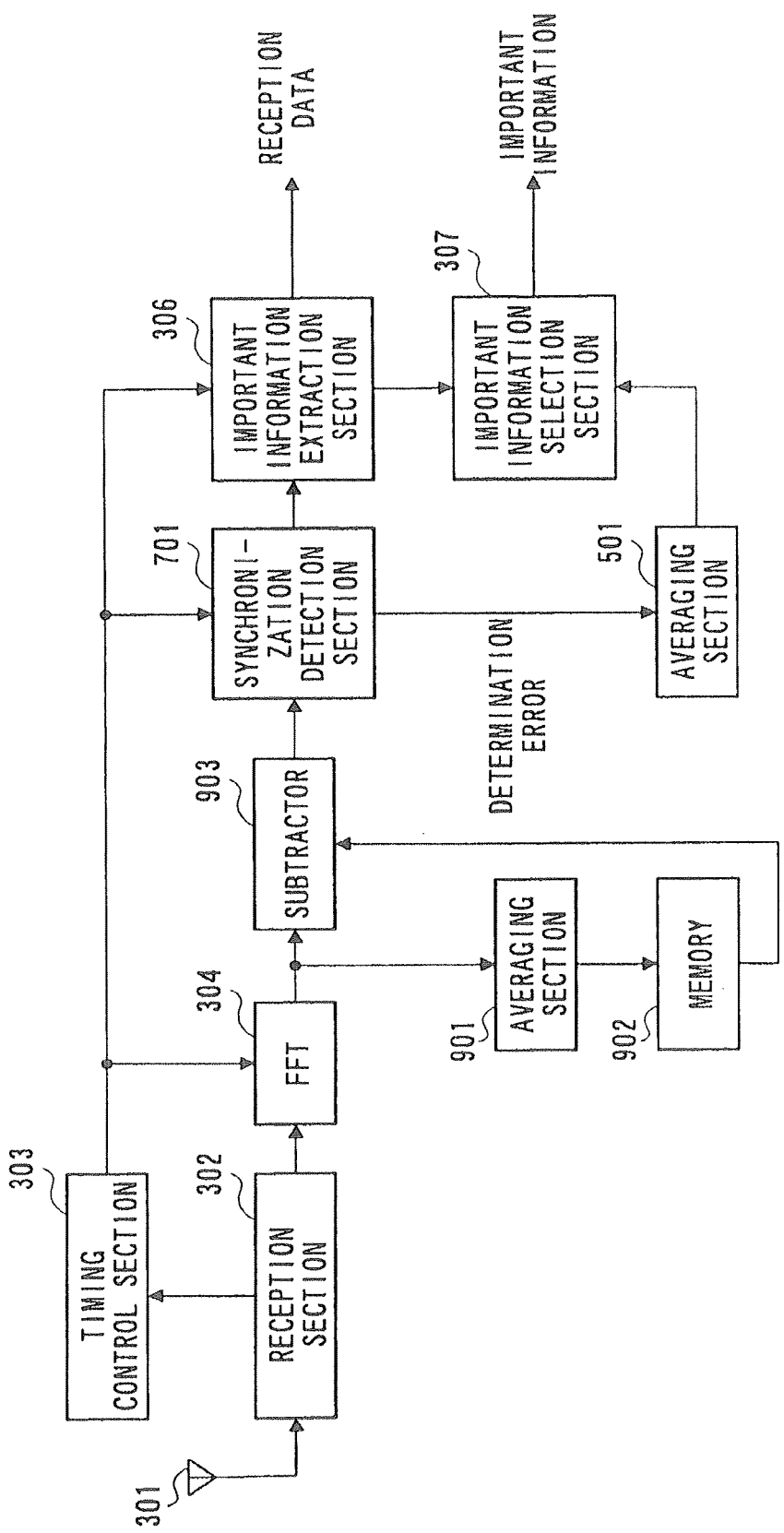
FIG. 11 is a block diagram showing a configuration of a reception system of an OFDM transmission/reception apparatus according to Embodiment 5 of the present invention.

The apparatus according to the present embodiment is explained with reference to FIG. 11. FIG. 11 is a block diagram showing a configuration of a reception system of the OFDM transmission/reception apparatus according to Embodiment 5 of the present invention. The parts in FIG. 11 with the same configuration as that of Embodiment 4 are assigned the same codes and their detailed explanations are omitted. The block diagram of the transmission system is omitted. The present embodiment also uses the second subcarrier as the subcarrier other than the DC subcarrier to carry important information.

In FIG. 11, averaging section 901 adds up and averages the FFT-processed DC subcarrier signals. This calculated average value is a DC offset value. The number of slots added up or the time interval can be determined arbitrarily. Memory 902 stores the calculated DC offset value.

Subtractor 903 reads a DC offset value in memory 902 one by one and subtracts the read DC offset value from the FFT-processed DC subcarrier signal. This makes it possible to eliminate the DC offset from the DC subcarrier signal.

Moreover, when removing a DC offset from the FFT-processed signal in slot n, if the DC offset value calculated from the signal in slot n is used, the DC offset eliminating speed is slowed down. Thus, it is desirable to use a DC offset calculated from a few immediately preceding slots taking account of the fact that DC offsets are considered to be almost constant when focused on a unit slot for a long period of time.

For example, averaging section 901 calculates a DC offset value for slots n-3 to n-1 and subtractor 903 subtracts this DC offset value from the reception signal in slot n. In this way, using a DC offset value for a few immediately preceding slots allows DC offset elimination processing without time lags.

Thus, the present embodiment adds up and averages DC subcarrier signals to calculate a DC offset and eliminates this DC offset from the DC subcarrier signals, which improves the reception quality of important information.

(Embodiment 6)

The OFDM transmission/reception apparatus according to the present embodiment has the same configuration as that of the OFDM transmission/reception apparatus according to Embodiment 5 except that important information carried by the DC subcarrier and important information carried by the second subcarrier are combined.

Embodiments 1 through 5 describe embodiments that select the DC subcarrier or second subcarrier, whichever has a better reception condition. However, taking account of the fact that the reception quality of the DC subcarrier is also improved by eliminating DC offsets, the present embodiment combines both to obtain important information.

Figure 12:
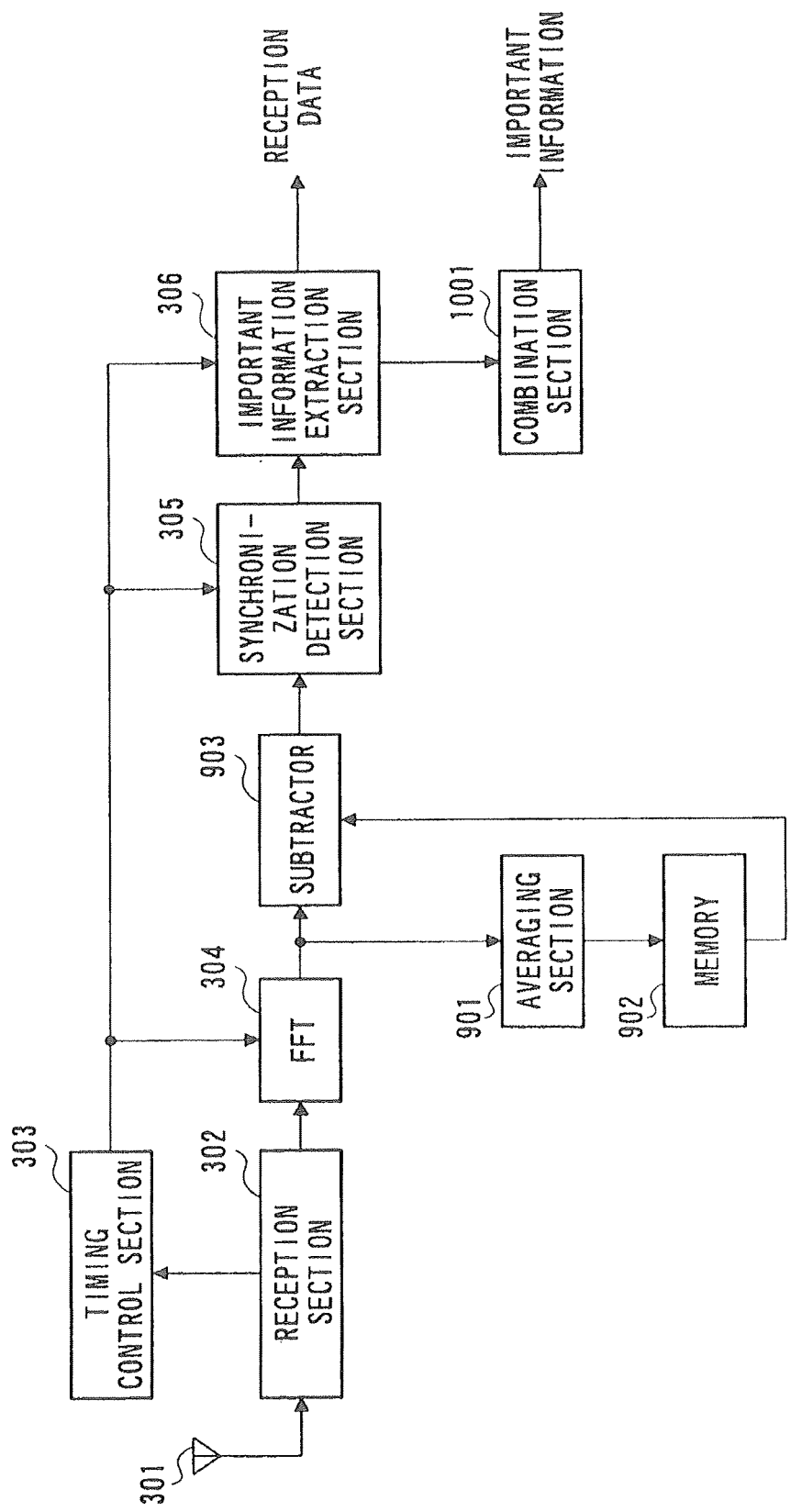
FIG. 12 is a block diagram showing a configuration of a reception system of an OFDM transmission/reception apparatus according to Embodiment 6 of the present invention.

The OFDM transmission/reception apparatus according to the present embodiment is explained with reference to FIG. 12. FIG. 12 is a block diagram showing a configuration of a reception system of the OFDM transmission/reception apparatus according to Embodiment 6 of the present invention. The parts in FIG. 12 with the same configuration as that of Embodiment 1 are assigned the same codes and their detailed explanations are omitted. The block diagram of the transmission system is omitted. The present embodiment also uses the second subcarrier as the subcarrier other than the DC subcarrier to carry important information.

In FIG. 12, combination section 1001 combines the important information carried by DC subcarrier and the second subcarrier which are extracted by important information extraction section 306, and outputs the combined important information.

Thus, the present embodiment eliminates influences of DC offsets from the DC subcarrier signal and then combines the important information carried by the two subcarriers, which improves the reception quality of important information.

(Embodiment 7)

The OFDM transmission/reception apparatus according to the present embodiment has the same configuration as that of the OFDM transmission/reception apparatus according to Embodiment 6 except that combination processing is carried out after weighting processing according to the reception level is carried out.

Figure 13:
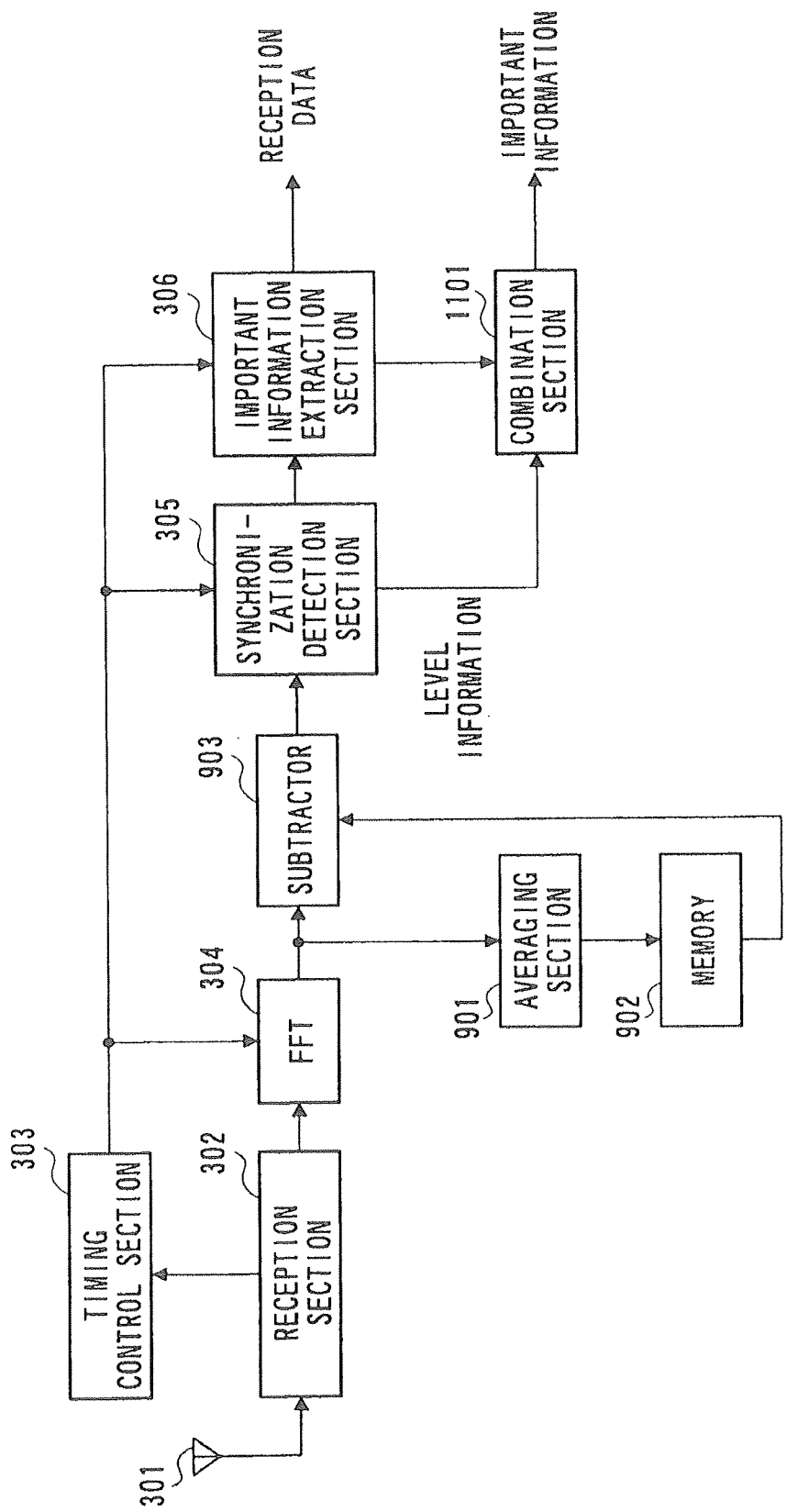
FIG. 13 is a block diagram showing a configuration of a reception system of an OFDM transmission/reception apparatus according to Embodiment 7 of the present invention.
Figure 14:
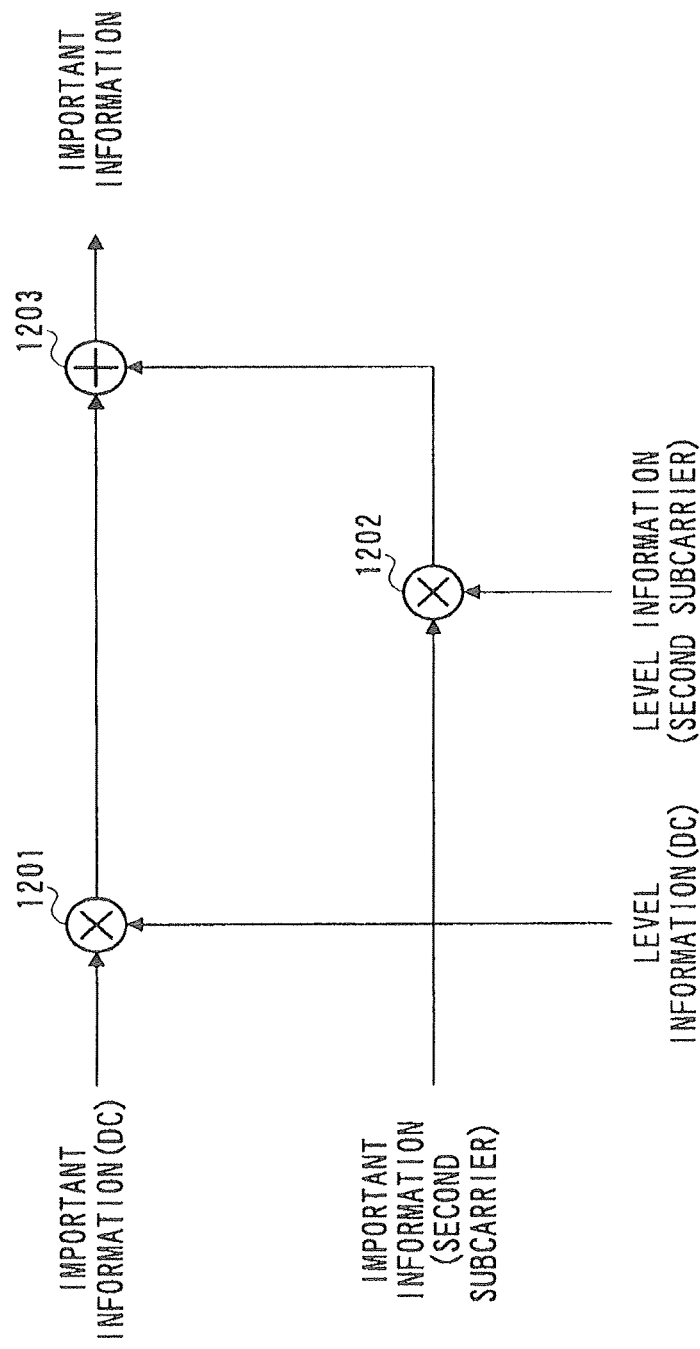
FIG. 14 is a block diagram showing a configuration of a combination section of the reception system of the OFDM transmission/reception apparatus according to Embodiment 7 of the present invention.

The OFDM transmission/reception apparatus according to the present embodiment is explained with reference to FIG. 13 and FIG. 14. FIG. 13 is a block diagram showing a configuration of a reception system of the OFDM transmission/reception apparatus according to Embodiment 7 of the present invention. FIG. 14 is a block diagram showing a configuration of a combination section of the reception system of the OFDM transmission/reception apparatus according to Embodiment 7 of the present invention. The parts in FIG. 13 and FIG. 14 with the same configuration as that of Embodiment 6 are assigned the same codes as those in Embodiment 6 and their detailed explanations are omitted. The present embodiment also uses the second subcarrier as the subcarrier other than the DC subcarrier to carry important information.

In FIG. 13, reception level information, which is one of outputs of synchronization detection section 305, is input to combination section 1101. Combination section 1101 performs a maximum-ratio combination on important information carried by the DC subcarrier and second subcarrier. That is, combination section 1101 carries out weighting processing on each important information and then combines the weighting-processed important information.

In FIG. 14, multiplier 1201 multiplies the important information carried by the DC subcarrier which are extracted by important information extraction section 306 by the reception level information of the DC subcarrier calculated by synchronization detection section 305.

Likewise, multiplier 1202 multiplies the important information carried by the second subcarrier which are extracted by important information extraction section 306 by the reception level information of the second subcarrier calculated by synchronization detection section 305. Adder 1203 adds up the output of multiplier 1201 and the output of multiplier 1202 and combines weighting-processed important information.

Thus, the present embodiment carries out a combination reflecting the reception level by eliminating influences of DC offsets from the DC subcarrier signal and then performing a maximum-ratio combination on the important information carried by the two subcarriers. In this way, the present embodiment can improve the reception quality of important information more than Embodiment 6.

(Embodiment 8)

The OFDM transmission/reception apparatus according to the present embodiment applies a specific packet (for example, packet carrying control information, packet carrying retransmission information or packet for a user with poor channel quality, etc.) as important information carried by a plurality of subcarriers in Embodiments 1 through 7. Here, the OFDM transmission/reception apparatus according to the present embodiment is explained with reference to Embodiment 1, but the OFDM transmission/reception apparatus according to the present embodiment is also applicable to Embodiments 2 to 7.

Figure 15:
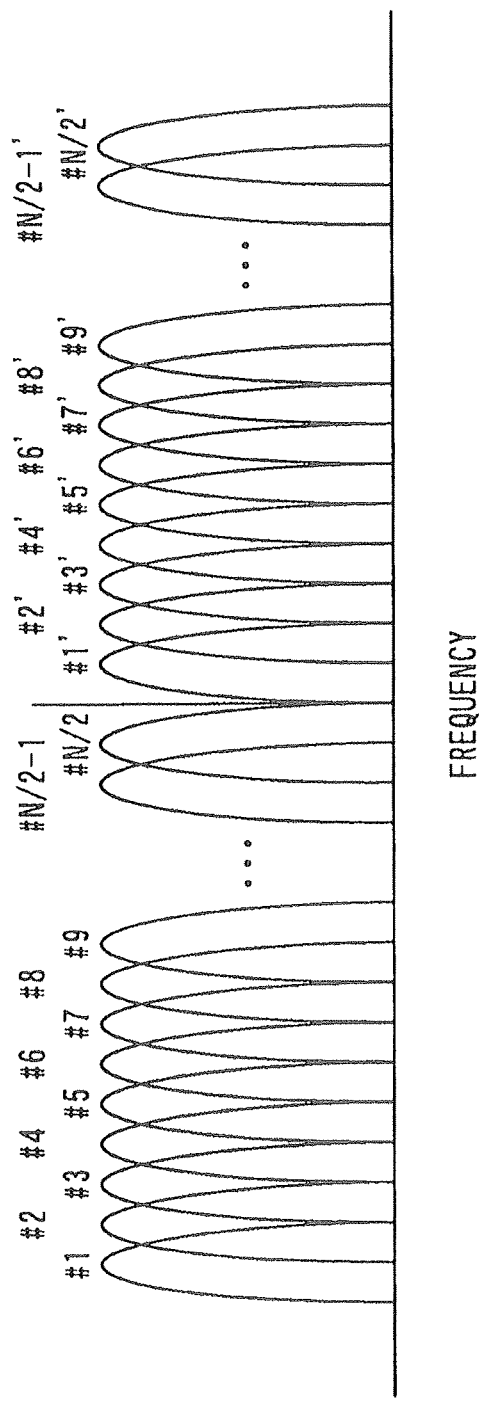
FIG. 15 is a schematic diagram showing a spectrum example of an OFDM transmission/reception apparatus according to Embodiment 8 of the present invention.
Figure 16:
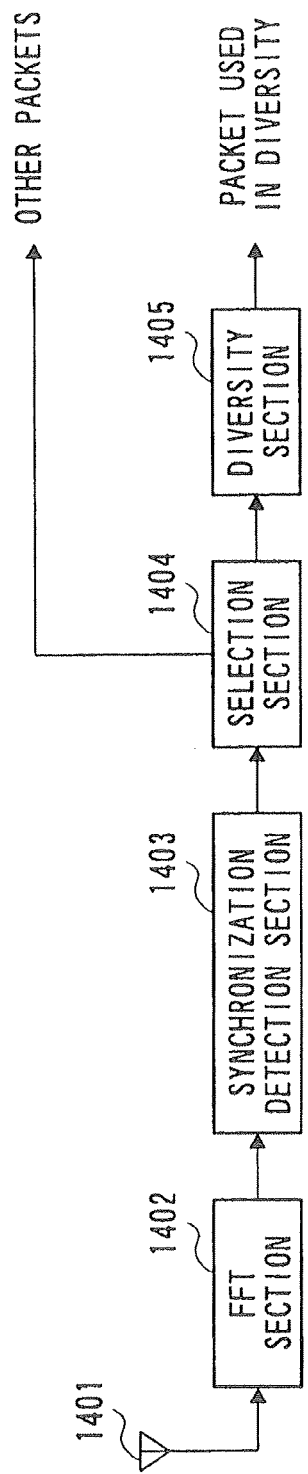
FIG. 16 is a block diagram showing a configuration of a reception system of the OFDM transmission/reception apparatus according to Embodiment 8 of the present invention.

The OFDM transmission/reception apparatus according to the present embodiment is explained with reference to FIG. 15 and FIG. 16. FIG. 15 is a schematic diagram showing a spectrum example of the OFDM transmission/reception apparatus according to Embodiment 8 of the present invention. FIG. 16 is a block diagram showing a configuration of a reception system of the OFDM transmission/reception apparatus according to Embodiment 8 of the present invention. The transmission system of the OFDM transmission/reception apparatus according to the present embodiment is mostly the same as that shown in FIG. 4.

In FIG. 4, which illustrates the transmission system, a transmission signal including a specific packet is modulated by modulation section 201. This specific packet is, for example, a signal transmitted through a control channel or a signal transmitted through multicast channels (channels received by a plurality of users). Needless to say, it is also possible to use a packet of a predetermined user, such as packet of a user having a reception system with poor reception quality, etc.

Mapping control section 202 controls IFFT section 203 so that the specific packet in the modulated transmission signal is mapped onto a plurality of subcarriers. The concrete mapping method by mapping control section 202 is as follows:

In mapping control section 202, data 1 of the modulated specific packet is mapped, for example, onto two subcarriers, subcarrier #1 and subcarrier #1' shown in FIG. 15. Furthermore, data 2 of the modulated specific packet is mapped, for example, onto two subcarriers, subcarrier #2 and subcarrier #2' shown in FIG. 15. Likewise, each piece of data of the modulated specific packet is mapped onto either one of the two subcarriers shown in FIG. 15.

Here, the case where there are two subcarriers onto which each piece of data of the modulated specific packet is mapped is explained, but the number of subcarriers above can further be increased. The number of subcarriers above can be determined according to various conditions such as transmission efficiency, etc.

Furthermore, mapping control section 202 controls IFFT section 203 so that packets other than the specific packet above of the modulated transmission signal is mapped onto one subcarrier as in the case of the conventional method.

The modulated transmission signal is controlled by mapping control section 202 as shown above and subjected to IFFT processing by IFFT section 203. The IFFT-processed transmission signal is subjected to transmission processing by transmission section 204 and then transmitted from antenna 205.

The radio signal with each piece of data in a specific packet mapped on any two subcarriers is received by antenna 1401 in FIG. 16. The signal received by antenna 1401 (reception signal) is subjected to predetermined reception processing and then FFT processing by FFT section 1402. The FFT-processed reception signal is subjected to synchronization detection processing by synchronization detection section 1403. Here, synchronization detection processing through synchronization detection section 1403 can be replaced by delay detection processing. The reception signal subjected to synchronization detection processing (or delay detection processing) is sent to selection section 1404.

The specific packet of the reception signal above is sent from selection section 1404 to diversity section 1405. In diversity section 1405, diversity reception processing is performed. That is, of the data pieces mapped on two subcarriers of the specific packet, the data piece with the higher reception level is selected or both data pieces mapped on the two subcarriers of the specific packet are combined.

As shown above, according to the present embodiment, the apparatus on the transmitting side carries data in a specific packet with a plurality of subcarriers and the apparatus on the receiving side selects the data piece with the better reception level of those data pieces of the specific packet above or combines the data pieces in the specific packet above, which allows the reception quality of the specific packet to be maintained even in a fading environment where only the reception level of a specific subcarrier deteriorates. This makes it possible to improve the error rate characteristic of the specific packet without reducing the transmission efficiency.

As explained above, the present invention transmits important information with two subcarriers instead of one subcarrier in the conventional method and uses a DC subcarrier as one of the two subcarriers carrying important information, thus can improve the reception quality of the important information at the apparatus on the receiving side without reducing the transmission efficiency.

The present invention is not limited to the above described embodiments, and various variations and modifications may be possible without departing from the scope of the present invention.

This application is based on the Japanese Patent Application No. HEI 11-054667 filed on Mar. 2, 1999 and the Japanese Patent Application No. HEI 11-249938 filed on Sep. 3, 1999, entire content of which is expressly incorporated by reference herein.

The invention claimed is:

1. An OFDM signal transmission apparatus comprising:
    a mapping control section configured to map first modulated signals corresponding to data 1 of a specific packet into a first number of subcarriers and to map second modulated signals corresponding to data 2 of a packet other than the specific packet into a second number of subcarriers to form an OFDM signal, the specific packet including retransmission information, the first number of the first modulated signals including the same data as the data 1, and the second number of the second modulated signals including the same data as the data 2; and
    a transmission section configured to transmit the formed OFDM signal,
    wherein the first number is larger than the second number.

2. The OFDM signal transmission apparatus according to claim 1, wherein
    the second number equals one.

3. An OFDM signal transmission method comprising:
    mapping first modulated signals corresponding to data 1 of a specific packet into a first number of subcarriers and second modulated signals corresponding to data 2 of a packet other than the specific packet into a second number of subcarriers to form an OFDM signal, the specific packet including retransmission information, the first number of the first modulated signals including the same data as the data 1, and the second number of the second modulated signals including the same data as the data 2; and
    transmitting the formed OFDM signal,
    wherein the first number is larger than the second number.

4. The OFDM signal transmission method according to claim 3, wherein
    the second number equals one.

\* \* \* \* \*